United States Patent
Zacher et al.

(10) Patent No.: US 6,850,018 B2
(45) Date of Patent: Feb. 1, 2005

(54) MOTOR CONTROL FOR AN EC-MOTOR

(75) Inventors: Wolfgang Zacher, Döbeln (DE); Andreas Knoll, Hartha (DE); Stefan Beyer, Frohburg (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/370,067

(22) Filed: Feb. 21, 2003

(65) Prior Publication Data

US 2003/0210004 A1 Nov. 13, 2003

(30) Foreign Application Priority Data

Feb. 22, 2002 (DE) .......................................... 102 07 565

(51) Int. Cl.⁷ ................................................. H02P 1/18
(52) U.S. Cl. ........................ 318/254; 318/439; 318/138
(58) Field of Search ................................. 318/138, 139, 318/254, 663; 123/342, 352, 396, 399, 361, 400

(56) References Cited

U.S. PATENT DOCUMENTS

| | | | | |
|---|---|---|---|---|
| 4,145,724 A | * | 3/1979 | Medding et al. ............... 360/92 |
| 4,392,502 A | * | 7/1983 | Weston ......................... 123/342 |
| 4,519,360 A | * | 5/1985 | Murakami .................... 123/399 |
| 4,519,361 A | * | 5/1985 | Murakami .................... 123/399 |
| 4,538,579 A | * | 9/1985 | Moriya et al. .............. 123/399 |
| 4,612,615 A | * | 9/1986 | Murakami .................... 701/110 |
| 4,856,477 A | * | 8/1989 | Hanaoka et al. ............. 123/399 |
| 5,122,720 A | * | 6/1992 | Martinson et al. .......... 318/663 |
| 5,293,102 A | * | 3/1994 | Martinson et al. ............. 318/2 |
| 6,107,696 A | | 8/2000 | Peter et al. |
| 6,163,122 A | | 12/2000 | De Filippis |
| 6,502,652 B2 | | 1/2003 | Rogg |

FOREIGN PATENT DOCUMENTS

| | | |
|---|---|---|
| DE | 39 35 593 A1 | 5/1991 |
| DE | 199 15 988 A1 | 10/2000 |
| DE | 100 65 488 A1 | 7/2001 |

\* cited by examiner

*Primary Examiner*—Paul Ip
(74) *Attorney, Agent, or Firm*—Griffin & Szipl, P.C.

(57) ABSTRACT

The invention rests on the idea that the information for controlling an EC-motor is taken from the adjustment or position of the control unit, which can be ascertained by means of a position indicator, such as a potentiometer, Hall indicator, etc. The current pattern for the EC-motor can thereafter, for example, be determined in a microcomputer disposed in the motor control for the control unit, without the motor having a rotor position determination.

14 Claims, 1 Drawing Sheet

MOTOR CONTROL FOR AN EC-MOTOR

FIELD OF THE INVENTION

The invention relates to a motor control for an EC-motor for positioning a control unit, particularly for vehicles.

BACKGROUND OF THE INVENTION

An electronic commutation motor (referred to as "EC-motor" herein) is a high efficiency electrical machine that operates with pulse modulation at, for example, ultrasonic frequencies. One example of an EC-motor is disclosed in U.S. Pat. No. 6,163,122 to De Filippis. Although not limited to use in the circuitry for motor vehicles, EC-motors are commonly used in motor vehicle construction as disclosed in U.S. Pat. No. 6,107,696 to Peter et al. and U.S. Pat. No. 6,502,652 to Rogg such as to provide power to operate a compressor of an air-conditioning system, or such as to provide an electromechanical energy converter arranged in the drive train, etc.

Known motor controls, such as are used to control EC-motors, compare a set value with an actual value obtained from a potentiometer for determining the position of a control unit. A controller present in the motor control produces a signal that is conducted to a four-quadrant amplifier. By the assistance of this signal, the electric motor is driven with such a current, that it effects the angular position predetermined by the set value.

Departing from this state of the art, German Document DE 3935593 A1, for example, proposes a device that can leave out a potentiometer for determining the position signal. In other words, this device does not include a potentiometer for determining the position signal. The determination of the position of the control member (control unit) results from, in one embodiment, the measurement and analysis of partial movements of a DC motor for moving the control unit. In this case, for progress of each armature segment of the DC motor, impulse recognition of the motor current is carried out, wherein an impulse is released and led to a controller. In a further embodiment, a Hall transmitter, or, as the case may be, a light detection device is employed instead of an impulse recognition device.

With the use of an electronic commutation motor (EC-motor), the correct current of individual motor windings is effected by means of the evaluation of the rotor position sensor of the EC-motor and production of a corresponding commutation impulse. Comprehensive embodiments of this feature are also disclosed in German Document DE 10065488 A1.

EC-motors are evermore preferred because of their better reliability, but their use is kept minimal, because EC-motors have the disadvantage that they require rotor position indication for commutation and commutation electronics. These components make EC-motors expensive.

A further measurement device for reporting the position of a control unit is described in German Document DE 19915988 A1. In this case, a Hall sensor is used as a position indicator, wherein the Hall sensor is programmable, and whereby temperature dependent measurement errors can be corrected. No statements are made with respect to the "position control"/"position determination" of the motor, or, as the case may be, the motor control for positioning of the control unit.

It is an object of the present invention to present a simple motor control for a EC-motor for controlling a control unit.

SUMMARY OF THE INVENTION

The above object is solved by the characteristics of an embodiment of the present invention wherein a motor control for controlling a motor for adjusting a control unit with a position indicator is characterized in that the motor is an electronic commutating motor, whose current pattern is ascertained in dependence on a signal of the position indicator of the control unit, whereby the precise current impulses are ascertained empirically and/or calculated and saved in the motor control.

The invention is based on the idea that information for controlling an EC-motor can be taken from the attitude or position of the control unit itself by means of a position indicator, such as a potentiometer, Hall indicator, etc. The idea rests on the fact that the position of the control unit, as well as the rotor position of the motor, is always correlatable with one another, whereby a possible gear play does not have any significance. The angular information of a rotor position indicator already present in the motor is also shown in the signal of a position indicator of the control unit, that is, they are redundant.

The current profile for an EC-motor can be, for example, worked up in the control for the control unit, without the motor having to have a rotor position determination.

Other advantageous embodiments in accordance with the present invention include the following. In accordance with another embodiment, the EC-motor does not have a rotor position sensor.

In accordance with a still further embodiment of the invention, the current pattern is saved in a current table.

In accordance with yet another embodiment of the invention, the current pattern is ascertained by energizing one or more windings of the rotor of the motor after incorporation into the control unit, whereby the rotor is brought into a defined starting position, which thereafter leads to a next position and by means of these two obtained position signals, a precise commutation angle can be calculated from a table/curve/function saved in the motor control.

In accordance with another embodiment of the invention, the position indicator is a potentiometer.

In accordance with yet another embodiment of the invention, the position indicator is embodied in a sensor mechanism.

In accordance with a still further embodiment of the invention, a correction value is taken which fits in the lookup table stored in the motor control for the particular model of control unit or is an absolute term in a mathematical algorithm.

In accordance with a further embodiment of the invention, the invention provides a motor control circuit for controlling an electronic commutation motor, including: (a) a motor control connected to send a first control signal to an output amplifier; (b) an electronic commutation motor connected to receive an amplified first control signal from the output amplifier; (c) a drive connected to the electronic commutation motor, wherein the motor activates the drive in response to receiving the amplified first control signal; (d) a control unit connected to the motor by the drive, wherein the motor adjusts the position of the control unit using the drive; and (e) a position indicator disposed to ascertain a position of the control unit and generate a position signal, wherein the position indicator is connected to send the position signal to the motor control, and the motor control generates a second control signal with the position signal, wherein a current pattern of the motor is ascertained in dependence on at least one position signal generated by the position indicator, whereby current impulses of the current pattern are ascertained empirically or calculated and saved in the motor control.

In accordance with another embodiment of the invention, the position indicator is a potentiometer and the motor does not have a rotor position sensor.

In accordance with still another embodiment of the invention, the position indicator is embodied in a sensor mechanism.

In accordance with yet another embodiment of the invention, the current pattern is saved in a memory portion of the motor control in a current table.

In accordance with still another embodiment of the invention, the motor control is a microcomputer.

In accordance with a further embodiment of the invention, the current pattern is ascertained by energizing one or more windings of the rotor of the motor incorporated into the control unit, whereby the rotor is positioned into a starting position and moves to a next position, wherein the position indicator generates a first position signal corresponding to the starting position of the control unit and the position indicator generates a second position signal corresponding to the next position of the control unit, wherein a commutation angle is then calculated from the first position signal and the second position signal by using a look-up table stored in a memory portion of the motor control.

In accordance with a still further embodiment of the invention, the look-up table includes a correction value corresponding to the particular model of the control unit or that is an absolute term determined from a mathematical algorithm.

The derivation of the current pattern for the EC-motor results, for example, by means of a fixed assignment between a particular value range of the angular position of the control unit and a particular, that is, corresponding current pattern for the motor (i.e., its windings), which can also be provided in a separate control. This assignment can be calculated based on the aforementioned proportionality between the two, that is, the particular value range of the angular position of the control unit and the particular corresponding current pattern for the motor. It is further possible to provide and store the assignment of the current patterns for positioning the control organ by means of a learning cycle and examples. By means of this kind of process, manufacturing tolerances can be evened out.

The construction of the EC-motor in accordance with the present invention is simplified by the deletion of a suitable rotor position determination. The signal of the position indicator is used in the first instance as a set value for the position control as in the control of conventional control units, and, on the second hand, for determination, or, as the case may be, selection of the current pattern.

The term "control unit" comprises throttle valves as well as other flaps or valve hinges in a vehicle, such as a motor vehicle, an airplane, or a work vehicle, etc., without departing from the scope and spirit of the present invention. In other words, the motor control for an EC-motor in accordance with the present invention is applicable to vehicles in general and is not limited to use in a motor vehicle, an airplane, or a work vehicle. The invention will be further described by means of the illustrative embodiments and drawings. Thus, further objects, features and advantages of the present invention will become apparent from the Detailed Description of the Preferred Embodiments, which follows, when considered together with the attached drawings.

DETAILED DESCRIPTION OF THE PREFERRED EMBODIMENTS

Figure 1:
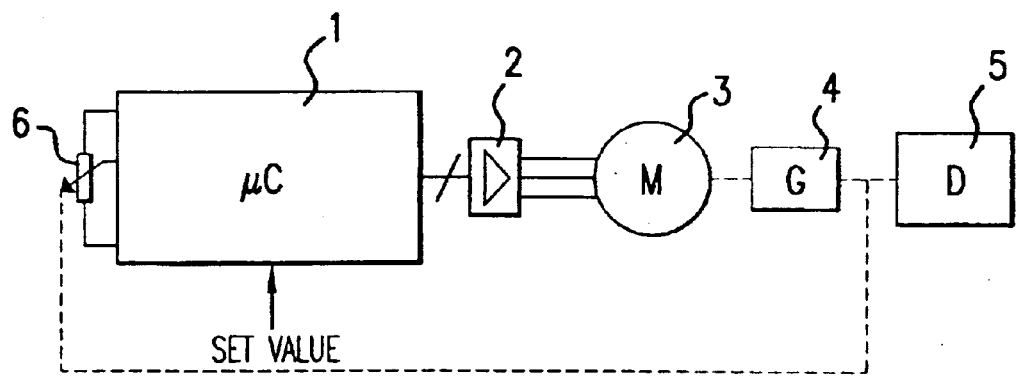
FIG. 1 is a block circuit diagram of the solution for motor control for an EC-motor according to the present invention.

The present invention is directed to a motor control for controlling an EC-motor for adjusting a control unit with a position indicator, and the invention will be described with reference to FIGS. 1 and 2, wherein like numerals indicate like parts.

Reference numeral 1 is a motor control, for example, a microcomputer ($\mu$C). This motor control 1 is connected to an output amplifier 2 that is connected to an electronic commutation motor 3. The electronic commutation motor 3, on the other hand, works on the control unit 5 over a drive 4. The control unit 5 is, in this example, a throttle valve of a not-explicitly-shown internal combustion engine of a motor vehicle. A potentiometer is used as position indicator 6 for ascertaining the position of the control unit 5 in this embodiment. A sensor mechanism 10 can also be used, as described as follows. In this case, a signal from the sensor mechanism 10 serves to generate and provide information to motor control 1 regarding the position of control unit 5.

Figure 2:
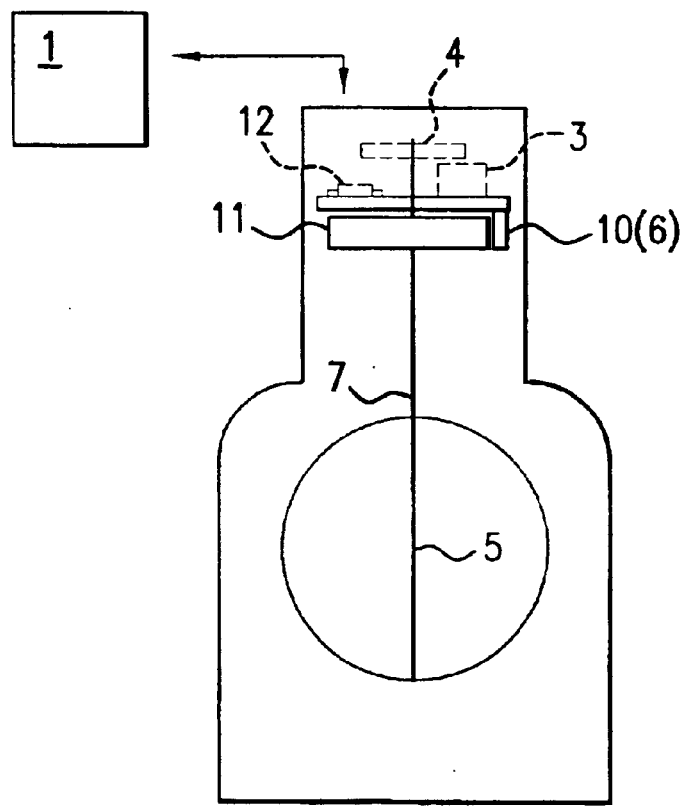
FIG. 2 is a simplified representation of a motor with a control unit from FIG. 1.

FIG. 2 shows a simplified representation of a mechanical connection between the motor 3 and the control unit 5. The motor 3 is connected with the control unit 5 over a drive 4. Drive 4 includes shaft 7 and is driven by motor 3. The control unit 5 is driven, that is, adjusted from the motor by means of the drive 4 and its shaft 7. In a known manner, the motor 3 receives an amplified control signal for adjustment from power amplifier 2, which receives the control signal from microcomputer 1. Simultaneous with the rotational movement of shaft 7, a magnet 11 disposed on the shaft 7 is moved relative to the sensor mechanism 10. In a known manner, the position of the control unit 5 is ascertained by means of this sensor mechanism 10. The sensor mechanism 10 can be a Hall indicator. For completeness sake, reference numeral 12 indicates further elements of the control switch. In other words, sensor mechanism 10 and further elements 12 provide a control switch.

The current signal, or as the case may be, current pattern, that is, the commutation angle for motor 3 for positioning control unit 5, is determined depending on the signal of the position indicator 6. In other words, the current signal or the current pattern used by motor 3 for positioning control unit 5 to a particular commutation angle originates from motor control 1 based upon the position signal or signals provided by position indicator 6 to motor control 1.

As used herein, "current signal" is a single signal generated by motor control 1 that is, for example in the preferred embodiment, amplified by output amplifier 2, for use as an actuating or controlling signal by motor 3. "Current signal" and "current impulse" as used herein are interchangeable. "Current pattern" as used herein defines a series or train of current signals, which provides a current waveform for controlling an EC-motor such as disclosed in U.S. Pat. No. 6,163,122 to DeFilippis, the entire disclosure of which is incorporated herein by reference.

With current signals or patterns provided by motor control 1, one or more windings of the runner (i.e., rotor) of the motor 3 are brought into a defined starting position after assembly of the motor 3 in the control unit 5 connection to the control electronics. In this defined starting position, the value, which corresponds to the position of the control unit 5, can be measured. A correction value can be calculated from this initially measured value, that is, taken from a lookup table, curve, or function for the particular model of control unit 5 (control type), or it can be taken from an absolute term in a mathematical algorithm. Even a complete lookup table can, in this manner, be determined in a learning cycle and saved in the memory portion of motor control 1. In other words, any lookup table, curve, or function would be saved in the memory of motor control 1.

One skilled in the art will appreciate that the present invention dispenses with the need of a position indicator for the rotor of the motor because the position indicator 6 for the control unit 5 is sufficient to determine the position of both the rotor of the motor and the control unit 5 because there is a correlatable, fixed relationship between the position of the rotor and the position of the control unit. From this fact, the present invention provides a simplified motor control circuit for an EC-motor that has a position indicator 6 for determining the position of both the rotor of the motor 3 and the control unit 5 so that the circuit does not include both a position indicator 6 for determining the position of the control unit 5 and a separate position indicator (i.e., "rotor position sensor") for determining the position of the rotor of EC-motor 3.

While the present invention has been described with reference to certain illustrative embodiments, one of ordinary skill in the art will recognize that additions, deletions, substitutions, modifications and improvements can be made while remaining within the scope and spirit of the present invention as defined by the appended claims.

What is claimed is:

1. A motor control assembly for controlling a motor for adjusting a control unit with a position indicator, wherein the motor control assembly comprises:
    a control unit connected with a position indicator, wherein the position indicator ascertains a position of the control unit;
    an electronic commutating motor comprising a current pattern determining a commutation angle for the motor, wherein the current pattern is ascertained in dependence on a position signal provided by the position indicator of the control unit, wherein the electronic commutating motor does not have a rotor position sensor; and
    a motor control connected to receive the position signal provided by the position indicator and to send a control signal to the electronic commutating motor,
        wherein the control signal comprises current impulses of the current pattern for determining the commutation angle for the electronic commutating motor, and the current impulses are ascertained empirically by the motor control or are calculated and saved in a memory portion of the motor control.

2. A motor control assembly according to claim 1, wherein the current pattern is saved in a current table.

3. A motor control assembly according to claim 1, wherein the current pattern is ascertained by energizing one or more windings of the rotor of the motor after incorporation into the control unit, whereby the rotor is brought into a defined starting position, which thereafter leads to a next position and by means of signals corresponding to these two obtained positions a commutation angle can be calculated from a table saved in the motor control.

4. A motor control assembly according to claim 3, wherein a correction value is taken which fits in the lookup table stored in the motor control for the particular model of control unit or is an absolute term in a mathematical algorithm.

5. A motor control assembly according to claim 1, wherein the position indicator is a potentiometer.

6. A motor control assembly according to claim 1, wherein the position indicator is embodied in a sensor mechanism.

7. A motor control assembly according to claim 6, wherein the sensor mechanism is a Hall indicator.

8. A motor control assembly according to claim 6, wherein the motor control assembly further comprises control switch elements, wherein the sensor mechanism and the control switch elements are connected to form a control switch.

9. A motor control circuit for controlling an electronic commutation motor, the circuit comprising:
    a motor control connected to send a first control signal to an output amplifier;
    an electronic commutation motor connected to receive an amplified first control signal from the output amplifier, wherein the motor does not have a rotor position;
    a drive connected to the electronic commutation motor, wherein the motor activates the drive in response to receiving the amplified first control signal;
    a control unit connected to the motor by the drive, wherein the motor is connected to adjust a position of the control unit using the drive; and
    a position indicator disposed to ascertain a position of the control unit and generate a position signal, wherein the position indicator is a potentiometer connected to send the position signal to the motor control, and the motor control generates a second control signal with the position signal, wherein a current pattern of the motor is ascertained in dependence on at least one position signal generated by the position indicator, whereby current impulses of the current pattern are ascertained empirically or calculated and saved in the motor control.

10. A motor control circuit as recited in claim 9, wherein the position indicator comprises a sensor mechanism.

11. A motor control circuit as recited in claim 9, wherein the current pattern is saved in a memory portion of the motor control in a current table.

12. A motor control circuit as recited in claim 9, wherein the motor control is a microcomputer.

13. A motor control circuit as recited in claim 9, wherein the current pattern is ascertained by energizing one or more windings of the rotor of the motor incorporated into the control unit, whereby the rotor is positioned into a starting position and moves to a next position, wherein the position indicator generates a first position signal corresponding to the starting position of the control unit and the position indicator generates a second position signal corresponding to the next position of the control unit, wherein a precise commutation angle is then calculated from the first position signal and the second position signal by using a look-up table stored in a memory portion of the motor control.

14. A motor control circuit as recited in claim 13, wherein the look-up table includes a correction value corresponding to the particular model of the control unit or that is an absolute term determined from a mathematical algorithm.

* * * * *